(12) United States Patent
Hecker

(10) Patent No.: US 7,784,721 B2
(45) Date of Patent: Aug. 31, 2010

(54) SPICE GRINDING AND DISPENSING DEVICE

(75) Inventor: Reid M. Hecker, Lake Ronkonkoma, NY (US)

(73) Assignee: Lifetime Brands, Inc., Garden City, NY (US)

( * ) Notice: Subject to any disclaimer, the term of this patent is extended or adjusted under 35 U.S.C. 154(b) by 18 days.

(21) Appl. No.: 12/041,096

(22) Filed: Mar. 3, 2008

(65) Prior Publication Data

US 2008/0217449 A1 Sep. 11, 2008

Related U.S. Application Data

(60) Provisional application No. 60/893,235, filed on Mar. 6, 2007.

(51) Int. Cl.
*A47J 42/04* (2006.01)
(52) U.S. Cl. .................................................. 241/169.1
(58) Field of Classification Search ................. 241/169, 241/169.1
See application file for complete search history.

(56) References Cited

U.S. PATENT DOCUMENTS 4,509,698 A 4/1985 David 5,988,543 A * 11/1999 Wu ............................. 241/168
6,962,302 B2 * 11/2005 Cheng ....................... 241/169.1
2005/0061898 A1 3/2005 Whitmer

FOREIGN PATENT DOCUMENTS

EP 0205935 9/1989
WO WO 02/19880 3/2002

OTHER PUBLICATIONS

Korean International Search Report for PCT Application No. PCT/US2008/002862 dated Jul. 16, 2008.

* cited by examiner

*Primary Examiner*—Mark Rosenbaum
(74) *Attorney, Agent, or Firm*—Ryan A. Schneider, Esq.; Troutman Sanders LLP

(57) ABSTRACT

A spice grinding and dispensing device generally intended to be used for grinding one spice in a first portion and a second spice in the other portion. Each portion of the dual spice grinder includes a handle or trigger that activates an independent rasp mechanism. When the trigger is pressed, the rasp activated thereby moves down and forces ground spice through an opening. The pressure of the rasp against the inside of the bottom of the grinder breaks up the spice, and only spice that is properly sized can fit through the opening. Furthermore, the opening may be adjustable so that a user can create a coarse or finely ground spice.

12 Claims, 4 Drawing Sheets

SPICE GRINDING AND DISPENSING DEVICE

CROSS REFERENCE TO RELATED APPLICATION

This application claims benefit under 35 U.S.C. §119(e) of U.S. Provisional Patent Application Ser. No. 60/893,235 filed 6 Mar. 2007, which application is hereby incorporated by reference.

BACKGROUND OF THE INVENTION

1. Field of the Invention

The present invention relates generally to a spice grinding and dispensing device, and in particular to a dual spice grinding and dispensing device that can be manipulated with one hand.

2. Description of Related Art

Grinding and dispensing devices are used in a variety of industries, for many different purposes. Generally, grinding and dispensing containers contain specific contents, such as particulates, which can be dispensed by an individual when desired. To prevent the contents of the container from being dispensed accidentally, many dispensing containers include a cap or lid that remains on the container during periods of nonuse, and is not subject to accidental opening.

In the food industry, grinding and dispensing containers that contain solid foods, such as herbs or spices, in granular or powder-like form, are commonly used. Dispensing containers are often bountiful in the kitchen, containing such materials as salt, pepper, basil, cinnamon, dill, mustard powder, garlic salt or powder, ginger, thyme, rosemary, nutmeg, oregano, paprika, parsley, saffron, and turmeric. Such materials are key ingredients in a variety of recipes for various foods.

In the culinary arts, a busy kitchen can be the focal point of creation, disarray, and demanding conditions. Amateur and professional chefs are often required to multitask during the cooking and/or creation process. For example, a cook may be stirring a substance with one hand, while adding additional ingredients with the other hand. Additionally, only one clean hand may be available for handling grinding and dispensing containers and utensils, because the other hand has been handling or preparing the food ingredients.

What is needed therefore is a grinding and dispensing device that is capable of being manipulated with one hand to both grind and dispense multiple spices. Additionally, such a grinding and dispensing device should allow a user to restrict the size of the granulated spice to be dispensed. It is to such a device that the present invention is primarily directed.

BRIEF SUMMARY OF THE INVENTION

Briefly described, in preferred form, the present invention is a unitary spice grinding and dispensing device with two portions, or halves, generally intended to be used for grinding one spice in a first portion and a second spice in a second portion. Thus, the present grinding and dispensing device includes a first portion and a second portion, each capable of separately containing contents to be grinded and dispensed. A mating assembly is provided for releasably securing the first portion to the second portion. The mating assembly can be a variety of assemblies, for example male and female elements cooperatively places and sized for snapping engagement, and a threaded assembly for threading the two portions together.

Each of the first and second portions includes a hand-activated grinding assembly comprising a rasp activation trigger and a rasp mechanism, whereupon activation, the rasp mechanism grinds at least a portion of the contents in the portion, and the ground up portion of the contents capable of dispensing from the portion. The rasp activation trigger can be a handle or trigger, a portion of which extends beyond the side of the portion from hand activation. For example, when the trigger of the first portion is pressed, the rasp of the first portion is activated, and forces the contents through a small opening of the first portion. The pressure of the rasp against the inside of the bottom of the first portion breaks up the contents, and only elements of the contents that are small enough to fit through the small opening can exit.

One or more of the portions can comprise an adjustable dispenser, such that a user can select the granularity level of ground contents that can be dispensed from the at least one portion. Thus, the opening can be adjustable so that the user can create a coarse or finely ground spice. The spice grinding and dispensing device allows a user to easily and quickly grind and dispense two spices using a single hand and a single device.

Each portion of the grinding and dispensing device can have a content filling end located in proximity to the mating assembly, and a dispensing end located distal the content filling end, although the place where contents are filled into the portion, and the place where ground content are dispensed from the portion, need not be on opposite ends of the portion. Preferably, the content filling end of each portion comprises a releasable plug assembly for filling each portion with content through the plug assembly (a plug and cooperatively-size aperture), and each dispensing end of each portion comprises an adjustable dispenser, such that a user can select the granularity level of ground contents that can be dispensed from the dispensing end of each portion.

A principle object of the present invention is to provide a grinding and dispensing device for multiple spices that can be operated with only one hand activation.

It is another object of the present invention to provide a grinding and dispensing device for multiple spices that can be used to grind and dispense multiple spices at a selected granularity level.

These and other objects, features and advantages of the present invention will become more apparent upon reading the following specification in conjunction with the accompanying drawings.

The detailed description explains the exemplary embodiments of the invention, together with advantages and features, by way of example with reference to the drawings.

DETAILED DESCRIPTION OF THE PREFERRED EMBODIMENTS

Figure 1:
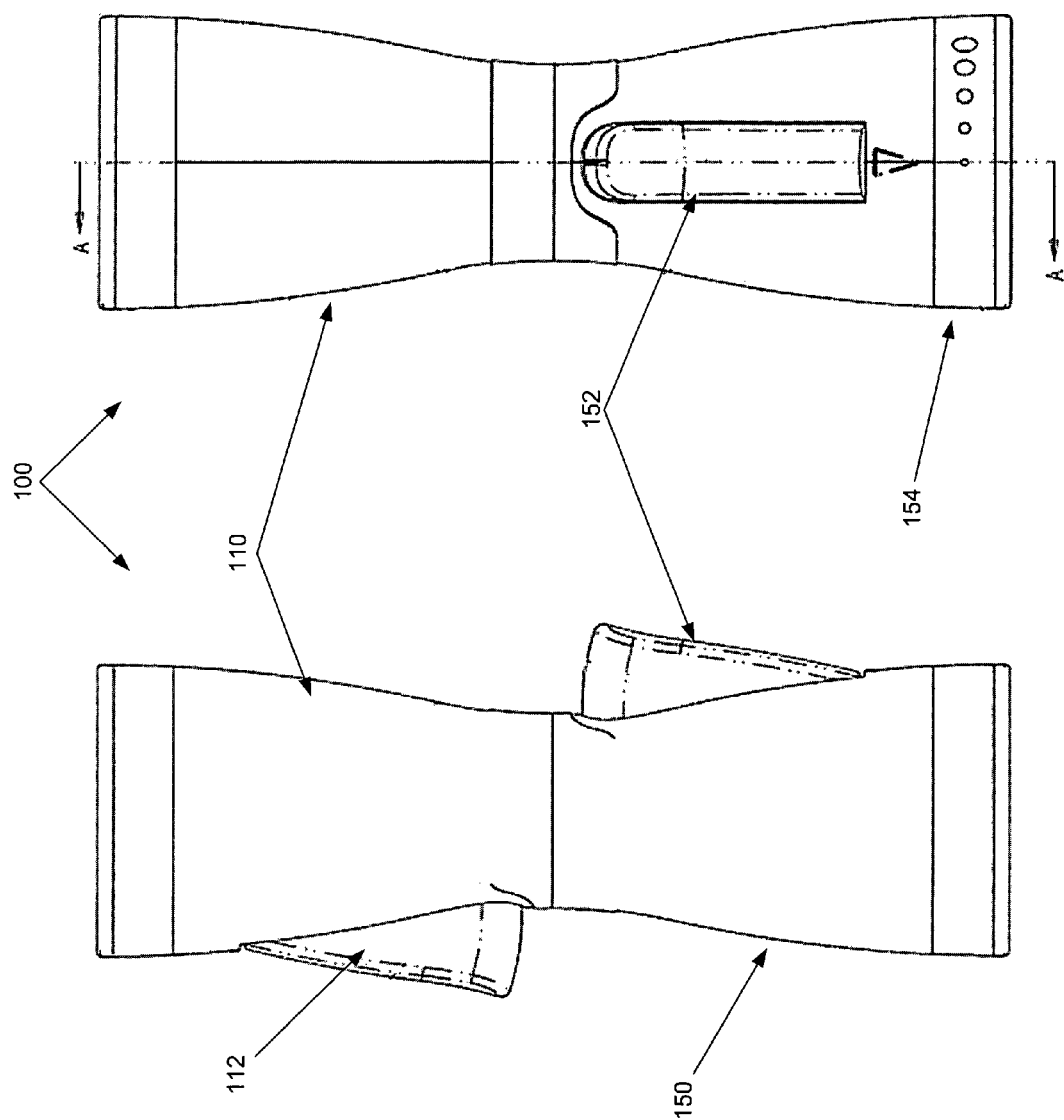
FIGS. 1A-1B, collectively known as FIG. 1, illustrate side views of a grinding and dispensing device in accordance with exemplary embodiments of the present invention.

Referring now in detail to the drawings, wherein like reference numerals represent like parts throughout the several views, a grinding and dispensing device 100 in accordance with an exemplary embodiment of the invention is illustrated in FIG. 1. The grinding and dispensing device 100 is designed to present a unitary look, yet comprising a first portion 110 (shown as being on the top of the device 100), and second portion 150 (shown as being on the bottom device 100), which are each designed to grind and dispense their own contents, which can be different.

While the device 100 is designed to present a unitary look, the first portion 110 and the second portion 150 can be removably affixed to one other at mating assembly 102. Mating assembly 102 permits the first portion 110 and the second portion 150 to be separated from each other such that each portion 110, 150 can be used individually, and can be refilled with, for example, spice particulates, if such refilling for each portion 110, 150 occurs via the proximity of the mating assembly 102.

The grinding mechanisms of each portion 110, 150 of the spice grinding and dispensing device 110 include a handle that moves a spring-loaded rasp, an aperture through which ground contents can exit the housing, and an adjustment mechanism to provide selected granularity levels of the contents.

The first portion 110 includes a first handle 112 designed to activate the grinder in the first portion 110. Likewise, the second portion 150 includes a second handle 152 designed to activate the grinder in the second portion. In exemplary embodiments, the first handle 112 and the second handle 152 can be disposed on opposite sides, either horizontally and/or vertically, of the grinding and dispensing device 100. Additionally, the positioning of the first handle 112 and the second handle 152 allow both handles to be selectively activated by a user using only one hand.

The first portion 110 also includes a first selection device 114, which is operable to control the maximum size of the spice particulate to be dispensed by the first portion 110. Likewise, the second portion 150 includes a second selection device 154, which is operable to control the maximum size of the spice particulate to be dispensed by the second portion 150.

In exemplary embodiments, the first portion 110 and the second portion 150 can be constructed, partially or wholly, of a plastic material with translucence, such that a user can view the amount of spice in each portion of the grinding and dispensing device 100. Additionally, a portion of the spice grinding and dispensing device 100 can be coated in a non-slip, or rubber like, material to facilitate the gripping of the spice grinding and dispensing device 100 by a user.

Figure 2:
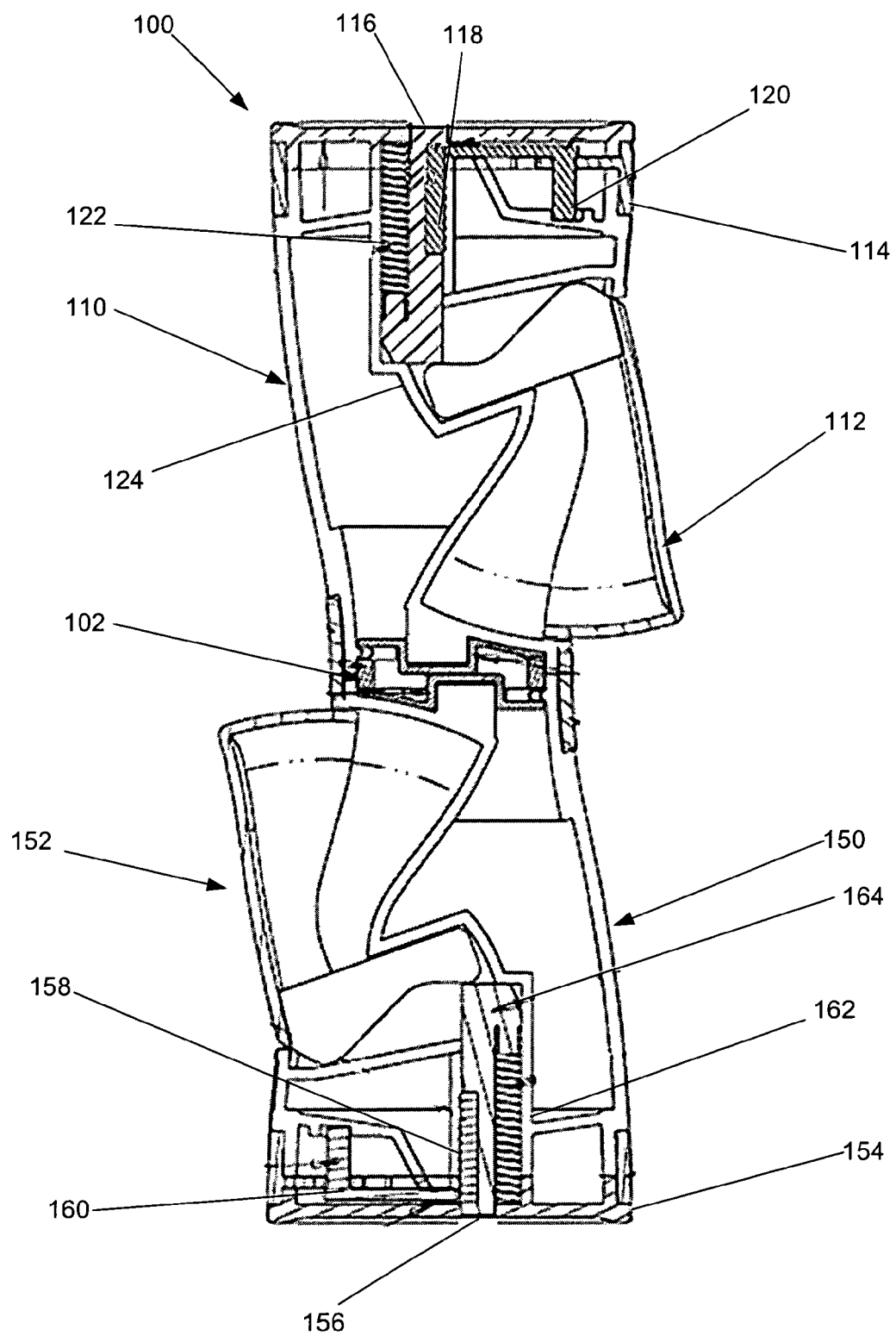
FIG. 2 illustrates a cross sectional view of the grinding and dispensing device of FIG. 1B in accordance with exemplary embodiments of the present invention.

A cross sectional view of the grinding and dispensing device 100 of FIG. 1 in accordance with exemplary embodiments of the present invention is illustrated in FIG. 2. As shown, the first portion 110 includes a first spice aperture 116, which is designed to allow grinded spice particulates to be dispensed there through. The first selection device 114 is affixed to a first selection bar 120 that is used to alter the size of the first spice aperture 116. Likewise, the second portion 150 includes a second spice aperture 156, which is designed to allow grinded spice particulates to be dispensed there through. The second selection device 154 is affixed to a second selection bar 160 that is used to alter the size of the second spice aperture 156.

A first spice rasp 118 is located in the first portion 110 that is designed to grind the spice located in the first portion 110 responsive to a force exerted on the first handle 112. The second portion 150 includes a second spice rasp 158 that is designed to grind the spice located in the second portion 150 responsive to a force exerted on the second handle 152.

The first portion 110 includes a first spring 122 that communicates with a first spice rasp holder 124, which in turn is in operable communication with the first handle 112. The second portion 150 includes a second spring 162 that communicates with a second spice rasp holder 164, which in turn is in operable communication with the second handle 152.

In exemplary embodiments, the first spice rasp 118 and the second spice rasp 158 can be constructed of various materials, which can be selected based on the particular spice that will be ground by the rasp. For example, a metal rasp can be used for grinding pepper due to the required strength of the rasp for grinding pepper. Likewise, a ceramic rasp can be used for grinding salt due to the corrosiveness of salt. Furthermore, other rasp materials can be selected for use with additional spices.

Figure 3:
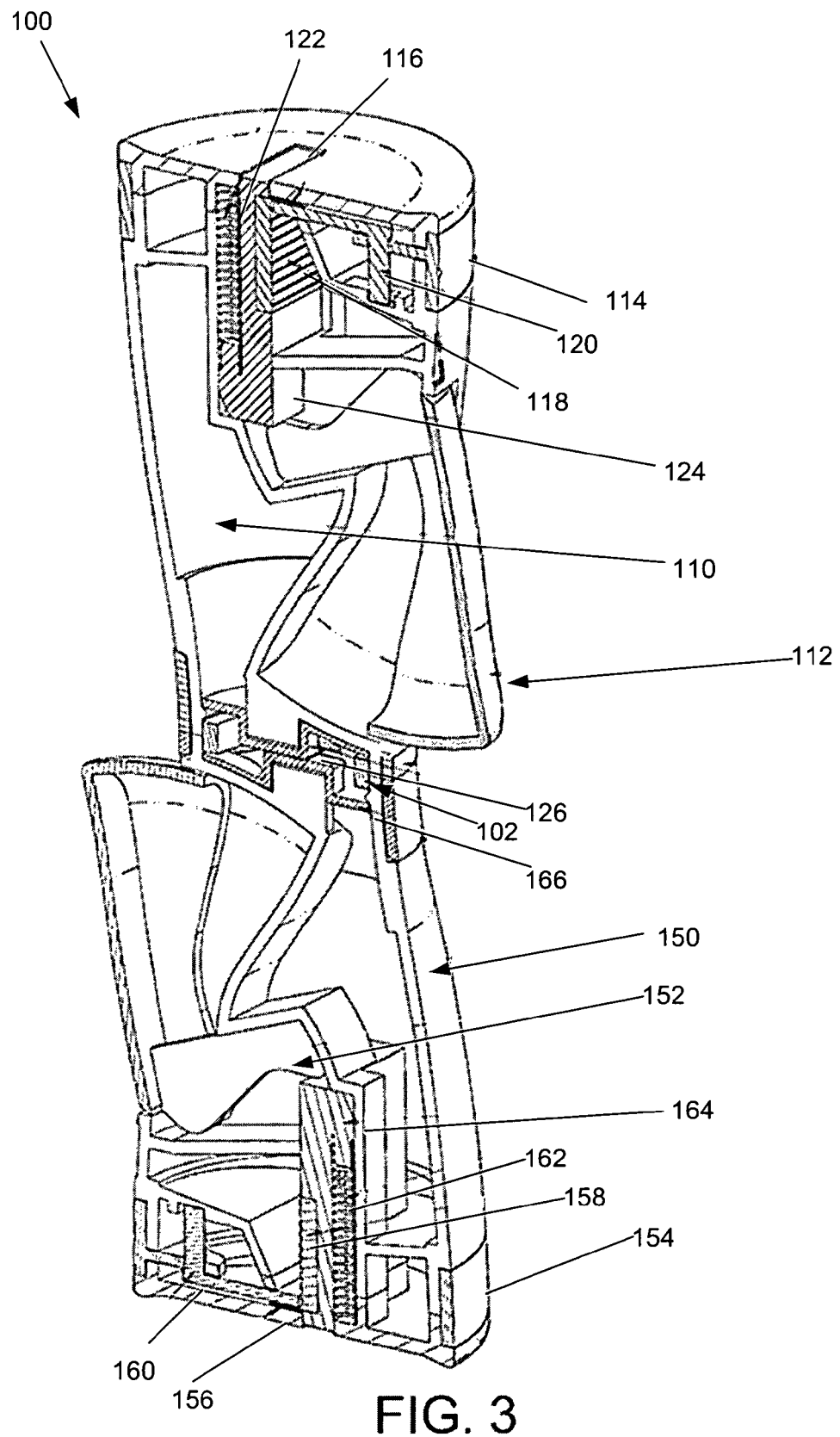
FIG. 3 illustrates a perspective view of a cross section of a grinding and dispensing device in accordance with exemplary embodiments of the present invention.

Referring now to FIG. 3, a perspective view of a cross-section of the spice grinding and dispensing device 110 is illustrated. The spice grinding and dispensing device 110 operates by receiving a force exerted on handle 112, 152 (preferably a squeezing force) that activates a rasp 118, 158 and a rasp holder 124, 164 against the force of a spring 122, 162.

When the user orients the portion 110, 150 he/she wishes to use downward (in FIG. 3, this is portion 150), the interior walls of the portion 110 and the second portion 150 guide the un-ground spice to the rasp 118, 158 with the help of gravity and responsive to a force on the handle 112, 152 the rasp grinds the spice. The ground spice is then dispensed from within the spice grinding and dispensing device 110 through the aperture 116, 156 at the dispensing end of the spice grinding and dispensing device 110. The selection device 114, 154 that can be moved to partially cover the aperture 116, 156 to varying degrees, controls the maximum size of the aperture 116, 156, and thus the size of the ground spice particulates to be dispensed.

The first portion 110 and the second portion 152 are removably affixed to one another at mating assembly 102. The first portion 110 includes a first plug 126, which as shown is disposed on the end opposite the first aperture 116, which can be removed from the first portion 110 to facilitate the addition of ungrounded spice to the first portion 110. Likewise, second portion 150 includes a second plug 166, disposed on the end opposite the second aperture 156, which can be removed from the second portion 150 to facilitate the addition of ungrounded spice to the second portion 150. It will be understood that such plugs 126, 166 can be located in other areas of the portions 110, 150.

Figure 4:
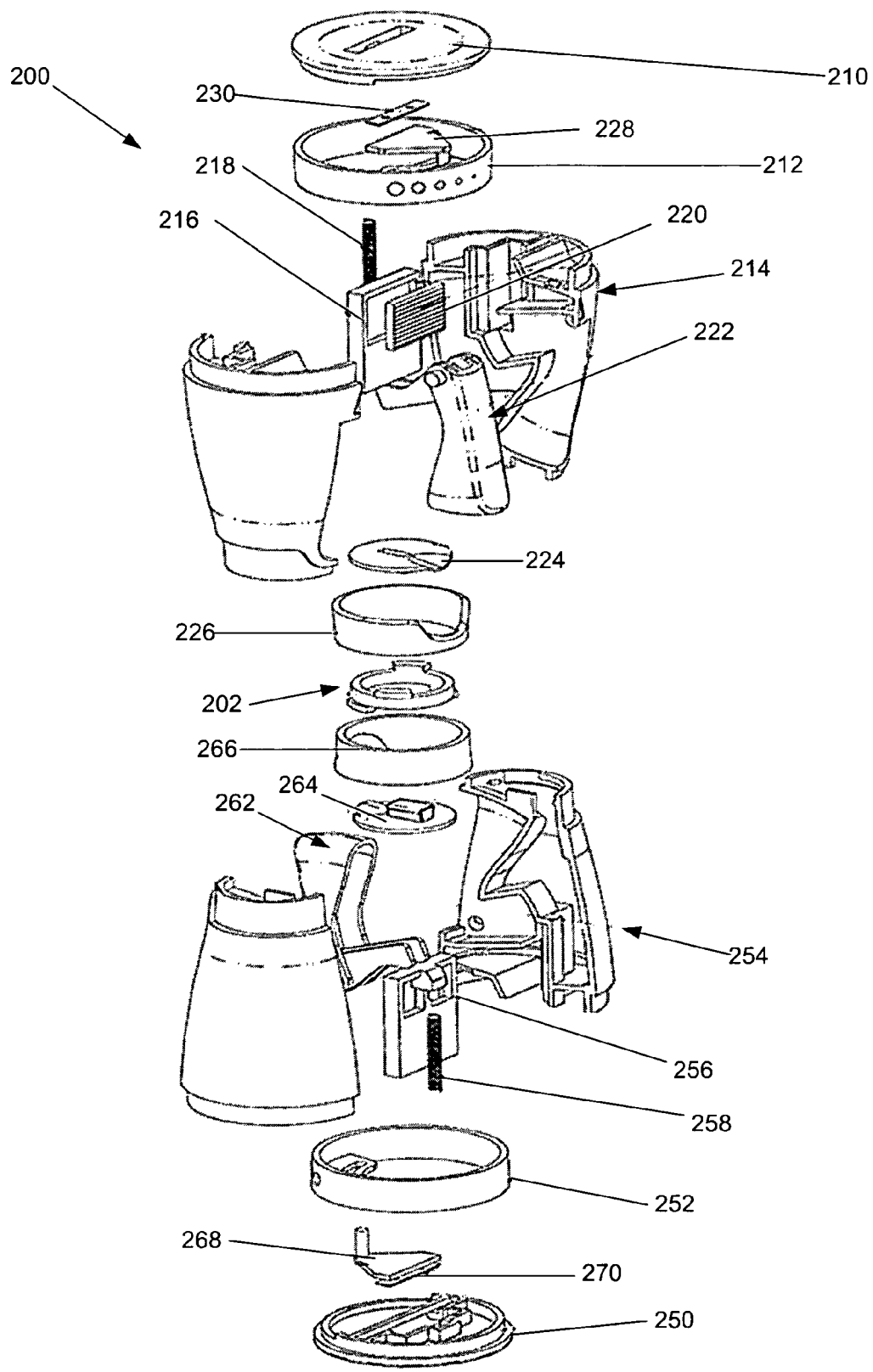
FIG. 4 illustrates an exploded view of a grinding and dispensing device in accordance with exemplary embodiments of the present invention.

Turning now to FIG. 4, a perspective exploded view of a spice grinding and dispensing device 200 in accordance with exemplary embodiments of the invention. The spice grinding and dispensing device 200 includes a first end piece 210 and a second end piece 250 that each include an aperture through which ground spice is dispensed. The spice grinding and dispensing device 200 also includes a dispensing aperture cover, which may be constructed of various materials depending on the spice to be dispensed. In one embodiment, the dispensing aperture cover can be constructed of stainless steel or similarly sturdy and non-corrosive material.

A first dispensing aperture cover 230 and a second dispensing aperture cover 270 are designed to be received in the aperture of the first end piece 210 and the second end piece 250, respectively. The first and second dispensing aperture cover 230 and 270 can be fixedly attached to first and second adjustment bars 228 and 268, respectively. The first dispensing aperture cover 230 moves with the first adjustment bar 228 when a user rotates the first adjustment ring 212, thereby partially covering or uncovering the rectangular shaped opening in the first end piece part 210. Likewise, the second dispensing aperture cover 270 moves with the second adjustment bar 268 when a user rotates the second adjustment ring 252, thereby partially covering or uncovering the rectangular shaped opening in the second end piece part 250.

The spice grinding and dispensing device 200 also includes a first handle 222 that actuates a first rasp holder 216 against the force of a first spring 218. A first rasp 220 is affixed to the first rasp holder 216 and is designed to grind a spice responsive to the force exerted on the first handle 222. Additionally, the spice grinding and dispensing device 200 includes a second handle 262 that actuates a second rasp holder 256 against the force of a second spring 258. A second rasp 260 is affixed to the second rasp holder 256 and is designed to grind a spice responsive to the force exerted on the second handle 262.

The spice grinding and dispensing device 200 also includes a first housing 214 and a second housing 254 that are designed to receive the components of the spice grinding and dispensing device 200. In exemplary embodiments, a portion of the first housing 214 and the second housing 254 can be constructed of a translucent plastic material such that a user can view the amount of ungrounded spice in the spice grinding and dispensing device 200. Additionally, another portion of the first housing 214 and the second housing 254 can be constructed of a non-slip, or rubber like, material that is designed to facilitate the user's grip of the spice grinding and dispensing device 200.

The spice grinding and dispensing device 200 includes a first plug 224 and a second plug 264, which are designed to be removably affixed to the first housing 214 and the second housing 254, and allow a user to add or remove spices from the spice grinding and dispensing device 200. Additionally, the spice grinding and dispensing device 200 includes a first grip portion 226 and a second grip portion 266 that are part of the first housing 214 and the second housing 254, respectively. The first grip portion 226 and the second grip portion 266 are at least partially constructed of a rubber like material to facilitate gripping of the spice grinding and dispensing device 200. The first grip portion 226 and the second grip portion 266 are disposed, respectively, on the outer surface of the first housing 214 and the second housing 254 such that the first grip portion 226 and the second grip portion 266 do not overlap one another. A mating assembly 202 is used to join the housings 214, 254 together, via a quarter-turn screw connection to the inside of both the first housing 214 and the second housing 254, thereby joining them together. The mating assembly 202 can also be designed to work in another similarly suitable manner.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A grinding and dispensing device comprising:
a first portion and a second portion, each capable of separately containing contents to be grinded and dispensed; and
a mating assembly for releasably securing the first portion to the second portion;
each of the first and second portions including a hand-activated grinding assembly comprising a rasp activation trigger and a rasp mechanism, whereupon activation, the rasp mechanism grinds at least a portion of the contents in the portion, and the ground up portion of the contents capable of dispensing from the portion;
wherein the hand-activated grinding assembly is single-hand activatable, enabling a user to both grind contents, and dispense ground contents, in either or both the first and the second portions with only a single hand;
wherein at least one of the portions comprises an adjustable dispenser, such that a user can select the granularity level of ground contents that can be dispensed from the at least one portion; and
wherein the adjustable dispenser is single-hand activatable, enabling a user to grind contents, adjust the granularity level of ground contents, and dispense the ground contents, with only a single hand.

2. The grinding and dispensing device of claim 1, wherein each portion has a content filling end located in proximity to the mating assembly, and a dispensing end located distal the content filling end.

3. The grinding and dispensing device of claim 2, wherein the mating assembly comprises male and female elements cooperatively placed and sized for snapping engagement of the first portion to the second portion.

4. The grinding and dispensing device of claim 2, wherein the mating assembly comprises a threaded assembly for threading the first portion to the second portion.

5. The grinding and dispensing device of claim 2, wherein the mating assembly comprises a quarter-turn screw connection to the inside of both the first portion and the second portion, thereby joining them together.

6. The grinding and dispensing device of claim 2, wherein the content filling end of each portion comprises a releasable plug assembly for enabling the filling of each portion with content through the plug assembly, and wherein the dispensing end of each portion comprises an adjustable dispenser, such that a user can select the granularity level of ground contents that can be dispensed from the dispensing end of each portion.

7. A grinding and dispensing device comprising:
a first portion and a second portion, each capable of separately containing contents to be grinded and dispensed, each portion comprising:
a content container having a dispensing end and a filling end;
a hand-activated grinding assembly comprising a rasp activation trigger and a rasp mechanism, whereupon activation, the rasp mechanism grinds at least a portion of the contents in the portion, wherein the hand-activated grinding assembly is single-hand activatable, enabling a user to both grind contents, and dispense ground contents, in either or both the first and the second portions with only a single hand; and
an adjustable dispenser, such that a user can select the granularity level of ground contents that can be dispensed from the dispensing end of the portion, wherein the adjustable dispenser is single-hand activatable, enabling a user to grind contents, adjust the granularity level of ground contents, and dispense the ground contents, with only a single hand;
and a mating assembly for releasably securing the first portion to the second portion at the filling end of the portions.

8. The grinding and dispensing device of claim 7, wherein the content filling end of each portion comprises a releasable plug assembly for enabling the filling of each portion with content through the plug assembly.

9. The grinding and dispensing device of claim 7, wherein each hand-activated grinding assembly further comprises a spring providing a spring-loaded rasp.

10. The grinding and dispensing device of claim 7, wherein the mating assembly comprises male and female elements cooperatively placed and sized for snapping engagement of the first portion to the second portion.

11. The grinding and dispensing device of claim 7, wherein the mating assembly comprises a threaded assembly for threading the first portion to the second portion.

12. The grinding and dispensing device of claim 7, wherein the mating assembly comprises a quarter-turn screw connection to the inside of both the first portion and the second portion, thereby joining them together.

* * * * *